United States Patent
Luo et al.

(10) Patent No.: US 12,388,379 B2
(45) Date of Patent: Aug. 12, 2025

(54) SENSORLESS MOTOR ASSEMBLY AND METHOD OF CONTROLLING THE SAME

(71) Applicant: TECHTRONIC CORDLESS GP, Anderson, SC (US)

(72) Inventors: Hai Ming Luo, Dongguan (CN); Hai Bo Ma, Hong Kong (CN); Yong Sheng Gao, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 119 days.

(21) Appl. No.: 18/264,163

(22) PCT Filed: Feb. 25, 2021

(86) PCT No.: PCT/CN2021/077825
§ 371 (c)(1),
(2) Date: Aug. 3, 2023

(87) PCT Pub. No.: WO2022/178746
PCT Pub. Date: Sep. 1, 2022

(65) Prior Publication Data
US 2024/0039437 A1    Feb. 1, 2024

(51) Int. Cl.
*H02P 6/185* (2016.01)
*H02P 6/18* (2016.01)
(Continued)

(52) U.S. Cl.
CPC .............. *H02P 6/181* (2013.01); *H02P 6/182* (2013.01); *H02P 6/20* (2013.01)

(58) Field of Classification Search
CPC .. H02P 6/185; H02P 6/182; H02P 6/20; H02P 6/181; H02P 2203/03; H02P 2203/05
(Continued)

(56) References Cited

U.S. PATENT DOCUMENTS 5,821,660 A * 10/1998 Anderson ................ H02K 3/28
                                                                  318/400.11
6,017,354 A    1/2000 Culp et al.
(Continued)

FOREIGN PATENT DOCUMENTS

CN    103501151 A    1/2014
CN    104158456 A    11/2014
(Continued)

OTHER PUBLICATIONS

Extended European Search Report for Application No. 21847918.6 dated Jan. 4, 2023 (7 pages).
(Continued)

*Primary Examiner* — Gabriel Agared
(74) *Attorney, Agent, or Firm* — Michael Best & Friedrich LLP

(57) ABSTRACT

A method of controlling a sensorless motor (32). The method contains the steps of determining a current speed of the motor (32); selectively using a first method, a second method, or a third method to determine a position of a rotor of the motor (32), depending on the current speed of the motor (32); and transmitting a drive signal to the motor (32) based on the determined position of the rotor. A sensorless motor assembly is also disclosed. According to the method, multiple rotor position detection methods are provided to the sensorless motor (32) which cover a full speed range of the motor (32).

16 Claims, 7 Drawing Sheets

(51) Int. Cl.
*H02P 6/182* (2016.01)
*H02P 6/20* (2016.01)

(58) Field of Classification Search
USPC .......................................................... 318/701
See application file for complete search history.

(56) References Cited

U.S. PATENT DOCUMENTS

| | | | |
|---|---|---|---|
| 6,090,123 | A | 7/2000 | Culp et al. |
| 6,329,778 | B1 | 12/2001 | Culp et al. |
| 6,752,816 | B2 | 6/2004 | Culp et al. |
| 7,422,582 | B2 | 9/2008 | Malackowski et al. |
| 7,517,351 | B2 | 4/2009 | Culp et al. |
| 7,638,958 | B2 | 12/2009 | Philipp et al. |
| 7,998,157 | B2 | 8/2011 | Culp et al. |
| 8,030,867 | B1 | 10/2011 | Allison, III |
| 8,358,093 | B1 | 1/2013 | Allison, III |
| 8,616,299 | B2 | 12/2013 | Ichikawa |
| 8,653,919 | B2 | 2/2014 | Culp et al. |
| 8,657,482 | B2 | 2/2014 | Malackowski et al. |
| 8,786,233 | B2 | 7/2014 | Fair et al. |
| 8,796,964 | B2 | 8/2014 | Dietl et al. |
| 8,847,531 | B2 | 9/2014 | Allison, III |
| 9,325,264 | B2 | 4/2016 | Iwaji et al. |
| 9,408,653 | B2 | 8/2016 | Fair et al. |
| 9,559,624 | B2 | 1/2017 | Philipp |
| 10,004,517 | B2 | 6/2018 | Philipp |
| 10,076,340 | B2 | 9/2018 | Belagali et al. |
| 10,340,824 | B2 | 7/2019 | Sun et al. |
| 10,483,948 | B2 | 11/2019 | Sun et al. |
| 10,517,610 | B2 | 12/2019 | Philipp et al. |
| 10,797,629 | B2 | 10/2020 | Lakshmi Narasimha et al. |
| 10,820,912 | B2 | 11/2020 | Wildgen et al. |
| 2002/0101208 | A1* | 8/2002 | Yost .......................... H02P 6/12 318/400.01 |
| 2006/0038517 | A1 | 2/2006 | Mackay |
| 2007/0250098 | A1 | 10/2007 | Malackowski et al. |
| 2010/0090631 | A1* | 4/2010 | Yang .......................... H02P 6/20 318/400.11 |
| 2011/0084639 | A1* | 4/2011 | Brown .................... H02P 6/182 318/400.35 |
| 2011/0198521 | A1* | 8/2011 | Hayashi .................... H02P 7/03 251/129.13 |
| 2011/0227523 | A1 | 9/2011 | Grantz |
| 2012/0062160 | A1 | 3/2012 | Yang et al. |
| 2014/0077738 | A1 | 3/2014 | Iwaji et al. |
| 2014/0333241 | A1 | 11/2014 | Zhao et al. |
| 2015/0130377 | A1 | 5/2015 | Hidaka et al. |
| 2015/0340980 | A1* | 11/2015 | Lovas ...................... H02P 6/183 318/400.33 |
| 2016/0287265 | A1 | 10/2016 | Macdonald et al. |
| 2017/0077851 | A1 | 3/2017 | Ma et al. |
| 2018/0054148 | A1* | 2/2018 | Zhao ....................... H02P 6/183 |
| 2018/0131295 | A1 | 5/2018 | Sun et al. |
| 2018/0360464 | A1 | 12/2018 | Irvine |
| 2019/0262977 | A1 | 8/2019 | Seith |
| 2019/0319562 | A1 | 10/2019 | Narumi |
| 2020/0113583 | A1 | 4/2020 | Philipp et al. |
| 2020/0287492 | A1 | 9/2020 | Sega |
| 2020/0389108 | A1 | 12/2020 | Yajurvedi et al. |
| 2020/0389109 | A1 | 12/2020 | Yajurvedi et al. |
| 2020/0389110 | A1 | 12/2020 | Yajurvedi et al. |
| 2021/0391815 | A1 | 12/2021 | Sega |
| 2021/0391816 | A1 | 12/2021 | Sega |
| 2021/0408954 | A1 | 12/2021 | Sega |
| 2022/0255479 | A1 | 8/2022 | Yajurvedi et al. |

FOREIGN PATENT DOCUMENTS

| | | |
|---|---|---|
| CN | 104579040 A | 4/2015 |
| CN | 104601072 A | 5/2015 |
| CN | 108258950 A | 7/2018 |
| CN | 108964531 A | 12/2018 |
| CN | 109450328 A | 3/2019 |
| DE | 102011050101 A1 | 11/2012 |
| DE | 202013008945 U1 | 10/2013 |
| EP | 2061147 A2 | 5/2009 |
| GB | 2535368 A | 8/2016 |
| WO | 2015093056 A1 | 6/2015 |
| WO | 2015169341 A1 | 11/2015 |
| WO | 2018214979 A1 | 11/2018 |
| WO | 2019149675 A1 | 8/2019 |
| WO | 2020001660 A1 | 1/2020 |
| WO | 2020214659 A1 | 10/2020 |

OTHER PUBLICATIONS

International Search Report and Written Opinion for Application No. PCT/CN2021/077825 dated Jul. 27, 2021 (10 pages).
European Patent Office Action for Application No. 21847918.6 dated Dec. 10, 2024 (5 pages).

* cited by examiner

SENSORLESS MOTOR ASSEMBLY AND METHOD OF CONTROLLING THE SAME

FIELD OF INVENTION

This invention relates to brushless motors, and in particular to the control method of brushless motors that have no hall sensors.

BACKGROUND OF INVENTION

Brushless motors are widely used in electrical appliances such as power tools because of their higher power efficiency, larger torque, and longer life term as compared to brushed motors. Most of the brushless motors currently deployed contain built-in sensors for determining the position of the rotor, and in particular hall sensors, because the position of the rotor relative to the stator is essential in determining the control sequence of multi-phase currents by the motor controller when driving the motor. Conventional motors include Hall sensors (or other rotary encoders) that provide rotor magnet position information to the motor controller. The motor controller selectively activates each phase U, V, and W based on the rotor magnet position information. Hall sensors and other external position sensors require additional parts and wiring that add cost, size, and design complexity to the motor drive. The presence of sensors also adds cost to the motor and reduces reliability of operation at high temperatures.

On the other hand, there is another type of brushless motors which are known as sensorless motors, which as its name suggests does not contain any sensor for the rotor's position. Compared to typical brushless motors, sensorless motors are inexpensive, lighter in weight, less complicated and less prone to failure.

However, there are also some disadvantages associated with traditional sensorless motors. When the rotor of a sensorless motor is rotating, its sensorless scheme can work perfectly, but this is not the case when the motor's rotor is stationary, and this leads to one major disadvantage of using conventional sensorless motors. Most traditional sensorless motors employ back EMF (BEMF) for determining the location of the rotor. However, when the motor's rotor is not turning, no back EMF is generated. Without back EMF, the drive circuitry of the sensorless motor lacks the information it needs to properly control the motor.

SUMMARY OF INVENTION

Accordingly, the present invention, in one aspect, is a method of controlling a sensorless motor. The method contains the steps of determining a current speed of the motor; selectively using a first method, a second method, or a third method to determine a position of a rotor of the motor, depending on the current speed of the motor; and transmitting a drive signal to the motor based on the determined position of the rotor.

In some embodiments, the first method is chosen if the motor is at zero speed.

In some embodiments, in case of the first method, the method further contains the steps of sending a plurality of voltage pulses to multiple phases of the motor; in response, detecting a peak value in a total current of the motor; and determining the position of the rotor based on an occurrence time of the peak value.

In some embodiments, the motor is a three-phase motor. The steps of sending a plurality of voltage pulses further contains sending six voltage pulses respectively to each of the three phases, and in both a forward and a reverse direction.

In some embodiments, based on a correlation between the occurrence time of the peak value to one of the six voltage pulses, determining the position of the rotor further includes determining the position of the rotor in one of six angular ranges, each being 60°.

In some embodiments, the second method is chosen if the current speed of the motor is above zero but below a threshold.

In some embodiments, in case of the second method, the method further includes sending a plurality of voltage pulses to multiple phases of the motor; in response; determining self-inductances or mutual-inductances of stator windings of the motor; and determining the position of the rotor based on the self-inductances or the mutual-inductances of the multiple phases.

In some embodiments, the step of determining self-inductances or mutual-inductances further contains the step of determining an air-gap flux density and a leakage flux density, in order to determine the self-inductances or the mutual-inductances.

In some embodiments, the third method is chosen if the current speed of the motor is above the threshold.

In some embodiments, in case of the third method, the method further includes the steps of measuring concurrently voltages of back electromotive force (BEMF) in multiple phases of the motor; and determining the position of the rotor based on the voltages of BEMF of the multiple phases.

In some embodiments, determining the position of the rotor based on the voltages of BEMF of the multiple phases further includes comparing the voltages of BEMF with each other to determine the position of the rotor.

In some embodiments, none of the first, second and third methods involves the detection of a phase current in the motor.

In another aspect of the invention, there is provided a sensorless motor assembly, which contains a motor that includes a stator and a rotor; a switching module adapted to connect the motor to a power supply; and a motor controller connected to the switching module. The motor controller is adapted to determine a position of the rotor using a first method, a second method, or a third method, depending on a current speed of the rotor.

In some embodiments, the motor controller is adapted to determine the position of the rotor using the first method if the motor is at zero speed.

In some embodiments, the motor assembly further contains a current sensor connected to the motor. In case of the first method, the motor controller is adapted to control the switching module to send a plurality of voltage pulses to multiple phases of the motor; in response, read an electromotive force and a peak value in a total current of the motor from the current sensor; and determine the position of the rotor based on the peak value and the electromotive force.

In some embodiments, the motor is a three-phase motor. In case of the first method, the motor controller is adapted to control the switching module to send six pulses respectively to each of the three phases, and in both a forward and a reverse direction.

In some embodiments, based on a correlation between an occurrence time of the peak value to one of the six voltage pulses, the motor controller is further adapted to determine the position of the rotor in one of six angular ranges, each being 60°.

In some embodiments, the motor controller is adapted to determine the position of the rotor using the second method if the current speed of the motor is above zero but below a threshold.

In some embodiments, in case of the second method, the motor controller is adapted to send a plurality of voltage pulses to multiple phases of the motor; in response, determine self-inductances or mutual-inductances of stator windings of the motor; and determine the position of the rotor based on the self-inductances or the mutual-inductances of the multiple phases.

In some embodiments, the motor controller is further adapted to determine an air-gap flux density and a leakage flux density, in order to determine the self-inductances or the mutual-inductances.

In some embodiments, the motor controller is adapted to determine the position of the rotor using the third method if the current speed of the motor is above the threshold.

In some embodiments, in case of the third method, the motor controller is further adapted to measure concurrently voltages of back electromotive force (BEMF) in multiple phases of the motor; and determine the position of the rotor based on the voltages of BEMF of the multiple phases.

In some embodiments, the motor assembly further includes a comparator which is adapted to compare the voltages of BEMF with each other, and send results of comparison to the motor controller.

In some embodiments, none of the first, second and third methods involves the detection of a phase current in the motor.

There are many advantages to the present invention, one being that multiple rotor position detection methods are provided to the sensorless motor which covers a full speed range of the motor. The BEMF detection method is suitable for use when the motor is at relatively high speed, in particular above a threshold. In comparison, when the motor is running in a low-speed region below the threshold, the BEMF method is no longer preferred because of the weak BEMF detected at low or zero speed. Embodiments of the invention then provide an inductance-based detection method that make use of self-inductances or mutual-inductances of stator coils of the motor. This is possible because stator phase inductances are dependent of rotor position, thus an observer could be built to track the variation of the phase inductance over an electrical period, and thus determine the rotor position. Lastly, when the motor is still (i.e. zero speed), the rotor's position can be detected by injecting six pulses to all phases of the motor and in both forward and backward directions, thus to detect the rotor's initial position by finding the occurrence time of the peak value of the motor current. The various detection methods therefore fully cover all possible speed regions of the motor and ensure that a best rotor position detection technique can be applied. The control of the motor based on the detection result is therefore possible without using position sensors like hall sensors.

In addition, the various detection methods according to embodiments of the invention can be conveniently adopted when the motor is started from any speed. For example, the motor may be previously cut power or braked, but if the motor is still running and then the user presses the trigger of the power tool again, then the motor upon energizing is brought back to operation, and depending on the speed at which the motor is re-energized, the motor controller could choose the appropriate detection method to resume operation of the motor.

The foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which.

DETAILED DESCRIPTION

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Figure 1:
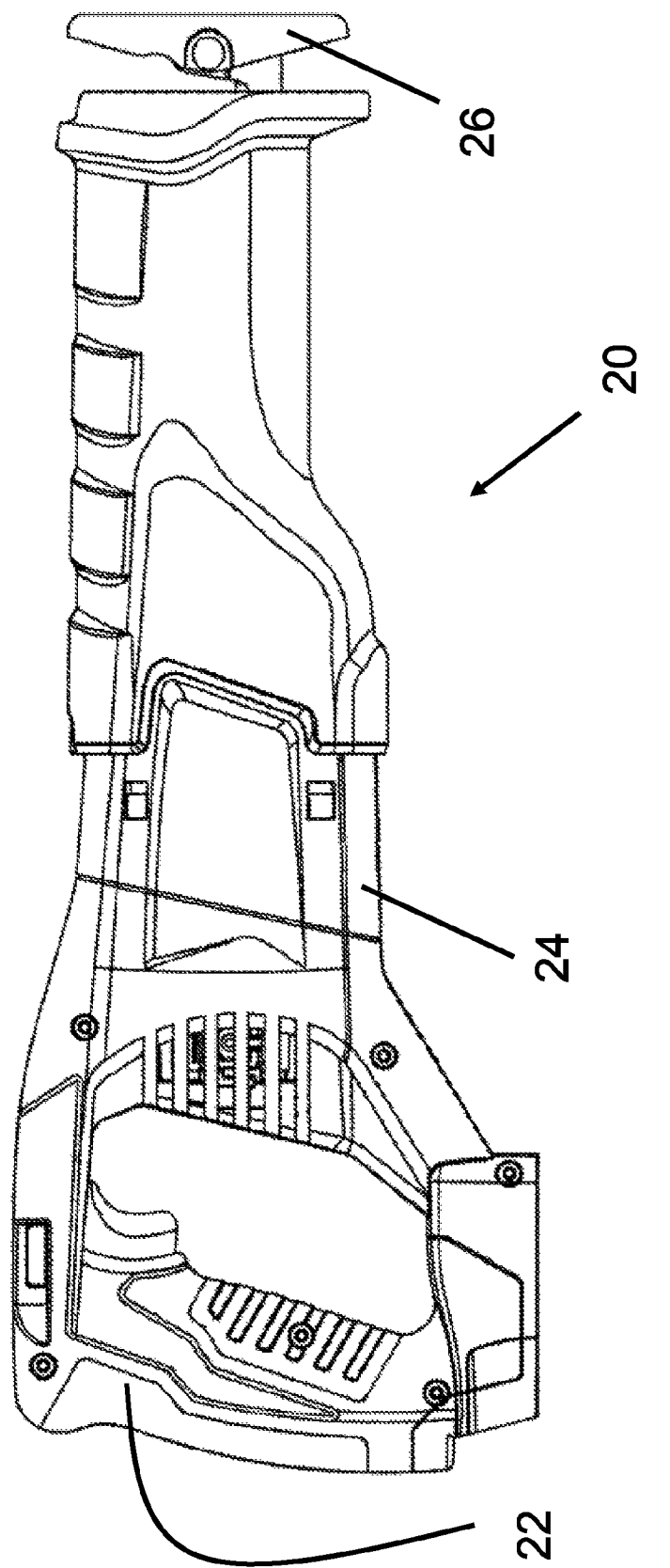
FIG. 1 is a power tool in which the proposed motor assembly/method of controlling the motor is adopted, according to an embodiment of the invention.

Referring now to FIG. 1, the first embodiment of the present invention is a power tool 20, in particular a portable reciprocating saw, to which a sensorless motor assembly can be applied. The power tool 20 is powered by a battery pack (not shown) that can be attached to its handle portion 22. The power tool 20 contains a housing 24 in which there is incorporated a sensorless motor assembly (not shown in FIG. 1) that contains a brushless direct-current (BLDC) motor, its driving circuit, and a motor controller. The motor controller and the driving circuit (e.g. a switching module comprising transistors) may be deployed on a same circuit board, or be located on different circuit boards, as those skilled in the art will understand. The power tool 20 further includes an output driver 26 (illustrated as a saw blade clamping member). Although FIG. 1 illustrates a reciprocating saw, it should be understood that the sensorless motor assemblies that will be described in details below may be incorporated into other types of power tools including drill-drivers, impact drivers, impact wrenches, angle grinders, circular saws, reciprocating saws, string trimmers, leaf blowers, vacuums, and the like.

Figure 2:
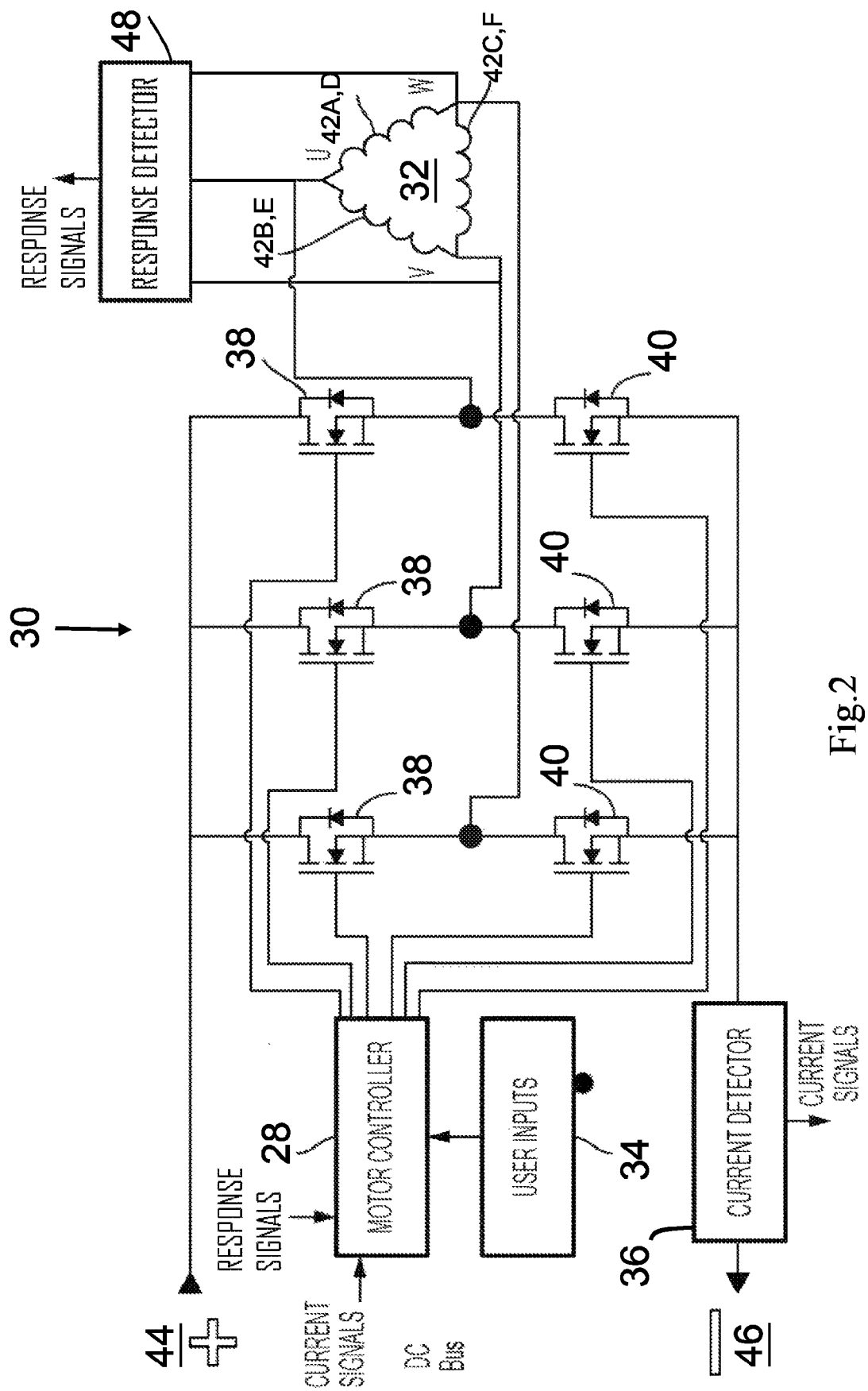
FIG. 2 is a schematic diagram of a motor assembly according to another embodiment of the invention.

FIG. 2 illustrates one example embodiment of a sensorless motor assembly used to provide a driving force to a power tool. The sensorless motor assembly in FIG. 2 can be applied to the power tool in FIG. 1, although skilled persons in the art would recognize that the sensorless motor assembly may be used in other types of power tools too as mentioned above. The sensorless motor assembly includes a motor controller 28, an inverter bridge 30, and a motor 32. In some embodiments, the motor controller 28 is implemented as a microprocessor with a separate memory. In other embodiments, the motor controller 28 is implemented as a microcontroller (with memory on the same chip). In other embodiments, the motor controller 28 may be implemented partially or entirely as, for example, a field programmable gate array (FPGA), an application specific integrated circuit (ASIC), hardware implemented state machine, etc., and the memory may not be needed or modified accordingly. The motor controller 28 controls the operation of the motor 32 through the inverter bridge 30, and the inverter bridge 30 is used as a switching module for electronically commutation of currents through the motor 32. The motor controller 28 is communicatively coupled to user inputs 34, and a current sensor 36. The user inputs 34 may include for example a trigger switch, a mode selector, and the like, all of which are not shown. The trigger switch may include, for example, a potentiometer, a distance sensor, or the like to determine and provide an indication of the distance the trigger is pulled to the motor controller 28. The current sensor 36 is coupled between the inverter bridge 30 and a negative DC bus 46 (i.e. in a return path from the motor to a power supply negative terminal) to detect the current flowing through each coil 32*a*, 32*b*, 32*c*, or a total current through the motor 32 (i.e. the DC supply current to the motor 32). The motor controller 28 performs variable speed control of the motor 32 through the inverter bridge 30 based on one or more of the inputs received from the user input 34 and feedback information including a position of the rotor (not shown) that is received from the motor 32.

Besides the current sensor 36, another module connected to the motor 32 is a response detector 48 that is in turn coupled to the motor controller 28. The response detector 48 is adapted to detect response from the motor 32 other than the line current (i.e. supply current), for example the response detector 48 may be a voltage sensor used to sense a phase voltage, e.g. for measuring the BEMF on each phase in order to determine an air-gap flux density and a leakage flux density in the stator windings of the motor 32. The response detector 48 is able to detect behaviors of the motor 32 upon the inverter bridge 30 injecting current pulses into the motor 32. The output of the response detector 48 is supplied to the motor controller 28 so that the latter can conduct computations to obtain a real-time position of the rotor of the motor 32. Note that the current detector 36 is also a type of response detector.

The motor 32 as shown in FIG. 2 is a three-phase BLDC motor, which contains a stator and a rotor (both not shown). In the motor 32, there is no position sensors like commonly used Hall sensors found in traditional BLDC motors. Rather, the rotor's position is determined by other feedbacks (e.g. current, BEMF voltage, inductance, flux density) from the motor and calculated by the motor controller 28, as will be described in more details below. In the example illustrated, stator windings of the motor 32 include six coils 42A-42F connected in a three phase, parallel delta configuration. In alternative embodiments, the coils 42A-42F may be connected in alternative configurations (e.g., series, delta, etc.).

The inverter bridge 30 controls the power supply to the three phases (e.g., U, V, and W) of the motor 32 of the power tool. The inverter bridge 30 includes high-side field effect transistors (FETs) 38 and low-side FETs 40 for each phase of the motor 32. The high-side FETs 38 and the low-side FETs 40 are controlled by corresponding gate drivers implemented in, for example, the motor controller 28.

The drain of the high-side FETs 38 is connected to a positive DC bus 44 (e.g., a power supply), and the source of the high-side FETs 38 is connected to the motor 32 (for example, coils 42A-42F of the motor 32) to provide the power supply to the motor 32 (i.e., the corresponding coil 42A-42F) when the high-side FETs 38 are closed. In other words, the high-side FETs 38 are connected between the positive DC bus 44 and the motor phase coils including the six coils 42A-42F.

The drain of the low-side FETs 40 is connected to the motor 32 (for example, phase coils of the motor 32) and the source of the low-side FETs 40 is connected to the negative DC bus 46 (e.g., ground). In other words, the low-side FETs 40 are connected between the motor phase coils and negative DC bus 46. The low-side FETs 40 provide a current path between the motor phase coils and the negative DC bus 46 when closed.

In the example illustrated, to the inverter bridge 30, the motor 32 appears as coils 42A-42F connected in a DELTA configuration. The below explanation is provided with the DELTA configuration as an example, however, the explanation is equally applicable to other configurations (e.g., a WYE configuration) and the controls for these other configurations are obtained using simple mathematical transforms. The three motor terminals are normally referred to as U, V, and W terminals. The inverter bridge 30 allows the motor 32 to connect each of its terminals to either the positive DC bus 44, the negative DC bus 46, or leave the terminal open as explained above. The motor controller 28 selectively enables the FETs 38, 40 to activate the coils 42A-42F using pulse-width modulated signals provided to the FETs 38, 40. The selective activation of the coils 42A-42F produces a force on the permanent magnets (not shown) of the rotor to rotate the rotor, allowing the motor 32 to provide mechanical driving force.

Figure 3:
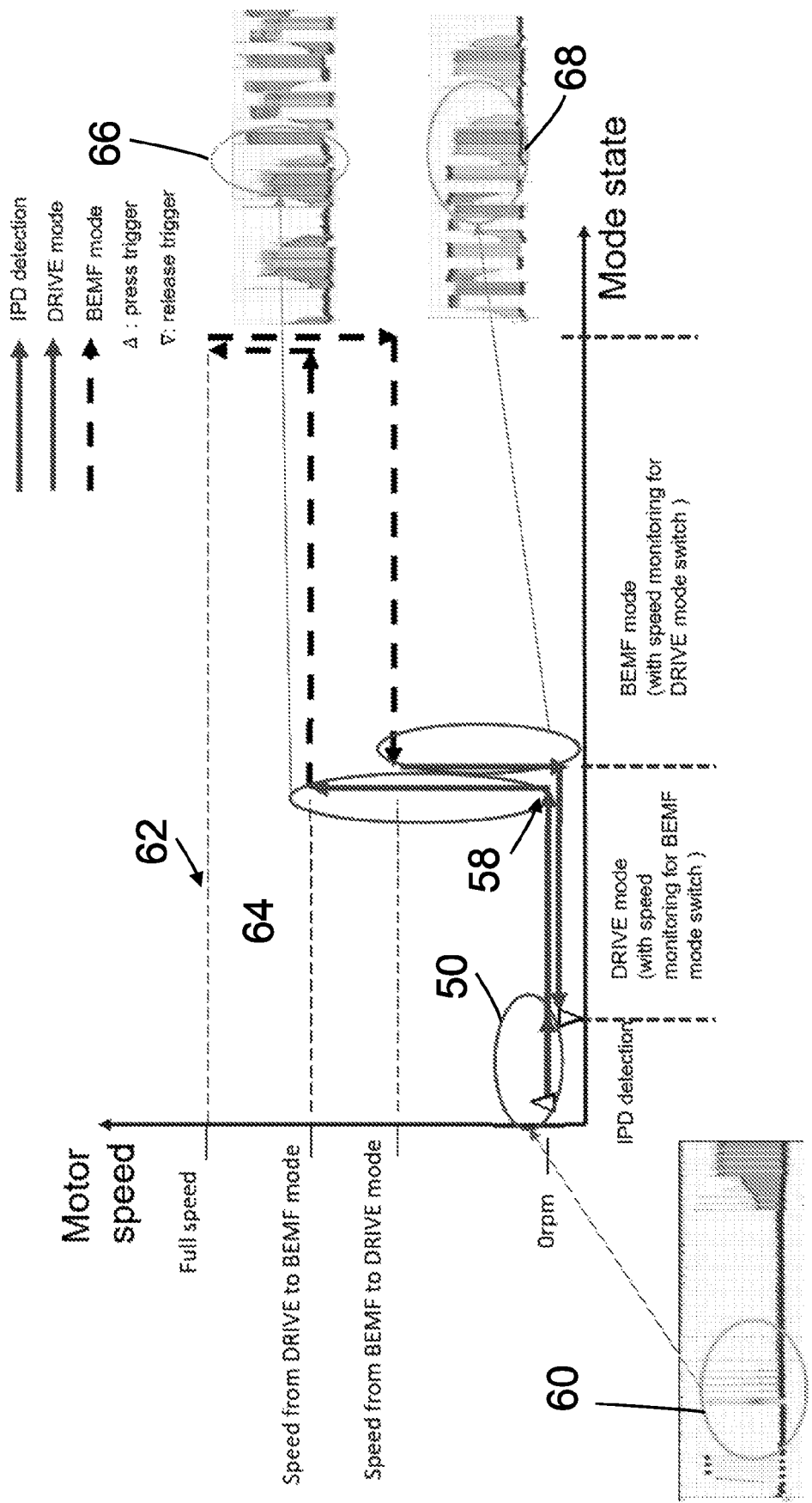
FIG. 3 shows the switching between three rotor position detection methods when the motor is started from zero speed according to another embodiment of the invention.
Figure 4:
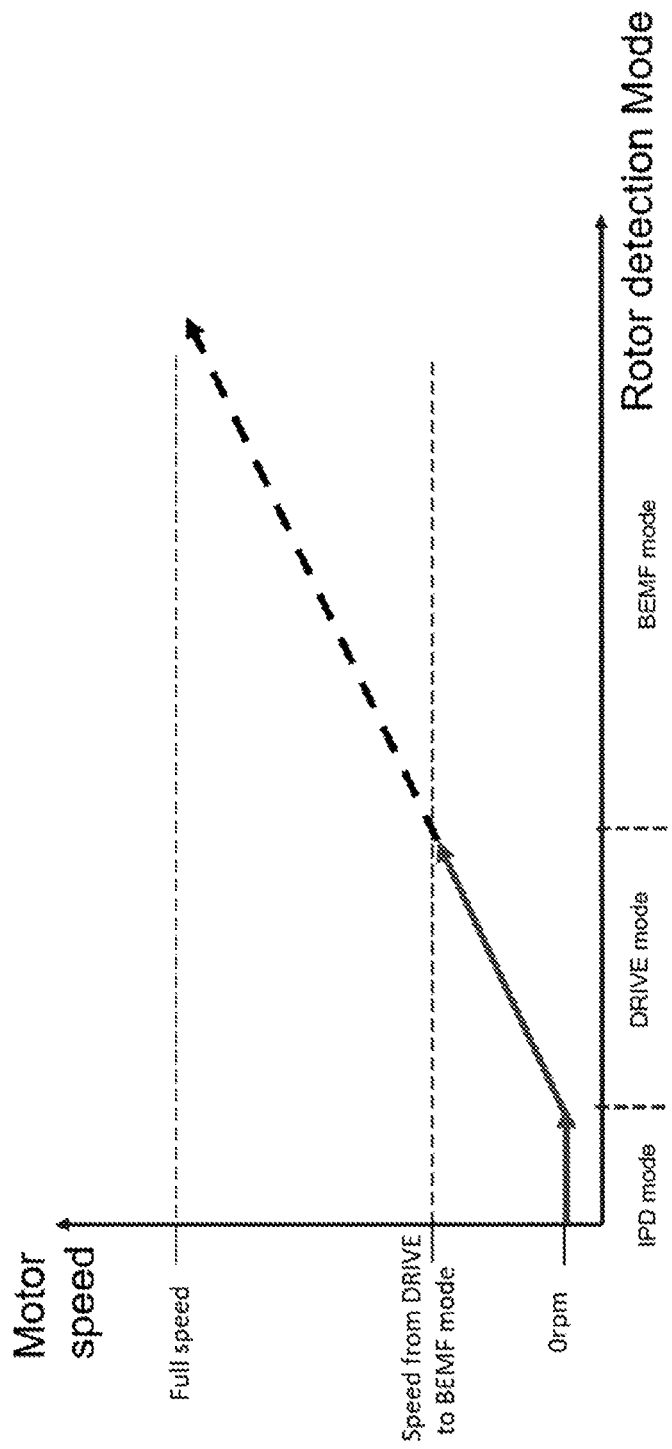
FIG. 4 is another chart showing the different speed regions of the motor of FIG. 3 and its rotor position detection methods.

Turning now to FIGS. 3-7, a sensorless motor control method according to an embodiment of the invention will now be described. The motor control method described herein is applicable to the sensorless motor assembly in FIG. 2, although skilled persons in the art would recognize that the control method may also be applied to other types of sensorless motor assembly/circuit. FIG. 3 shows the scenario of a sensorless motor being energized when the motor is still (at zero speed). In this method, since the motor is sensorless, an appropriate method has to be chosen to determine a position of the rotor during operation of the motor, and there are three methods that can be selected. In FIG. 3, as the motor assembly is first turned on when the motor is still, the BEMF method cannot be used because without rotation, it is impossible to detect any BEMF voltage from the stator winding. Instead, for this Initial Position Detection (IPD) mode where the motor is still (as shown by the circle 50 in FIG. 3), a first method that will be used to detect the initial position of the rotor, which is a six-pulses detection method. In this method, the motor controller sends a plurality of voltage pulses to multiple phases of the motor. In response, the motor controller determines self-inductances or mutual-inductances of stator windings of the motor, and determine the position of the rotor based on the self-inductances or the mutual-inductances of the multiple phases.

The six-pulse detection is conducted multiple times during the IPD mode, so as to minimize the error rate and inaccuracy that may resulted by a single detection, and also any potential, minor movement of the rotor because of the voltage pulses injected. Once these multiple detections have been attempted, the motor controller is aware of the rotor's initial position, and can start to drive the switching module at the moment shown by arrow 58 to drive the motor to rotate. Back to FIG. 3, the pulses of the three phases of the motor when the motor is in the IPD mode is shown by the waveforms 60, where one can see that the motor is not rotating as in at least one phase there is no effective current flow.

Once the motor is driven to start rotating after the IPD mode, the motor then enters the DRIVE mode until the speed of the motor arrives at a first threshold shown by arrow 62. As one can see, the DRIVE mode of the motor covers a substantial range of the motor speed, from near zero (but not at zero) to the threshold. In one example, the first threshold is set to be 3,000 RPM. If the motor speed is above the threshold, then the motor enters a BEMF mode. Both the DRIVE mode and the BEMF mode will be described in further details later. As shown in FIG. 3, when the motor speed is dropping from a high level, for example because of a braking action and/or de-energizing of the motor, then when the motor speed drops to a second threshold indicated by the arrow 64, the motor will return from the BEMF mode to the DRIVE mode. The second threshold can be equal to or different from the first threshold, and in an example the second threshold is 2,500 RPM.

Figure 6:
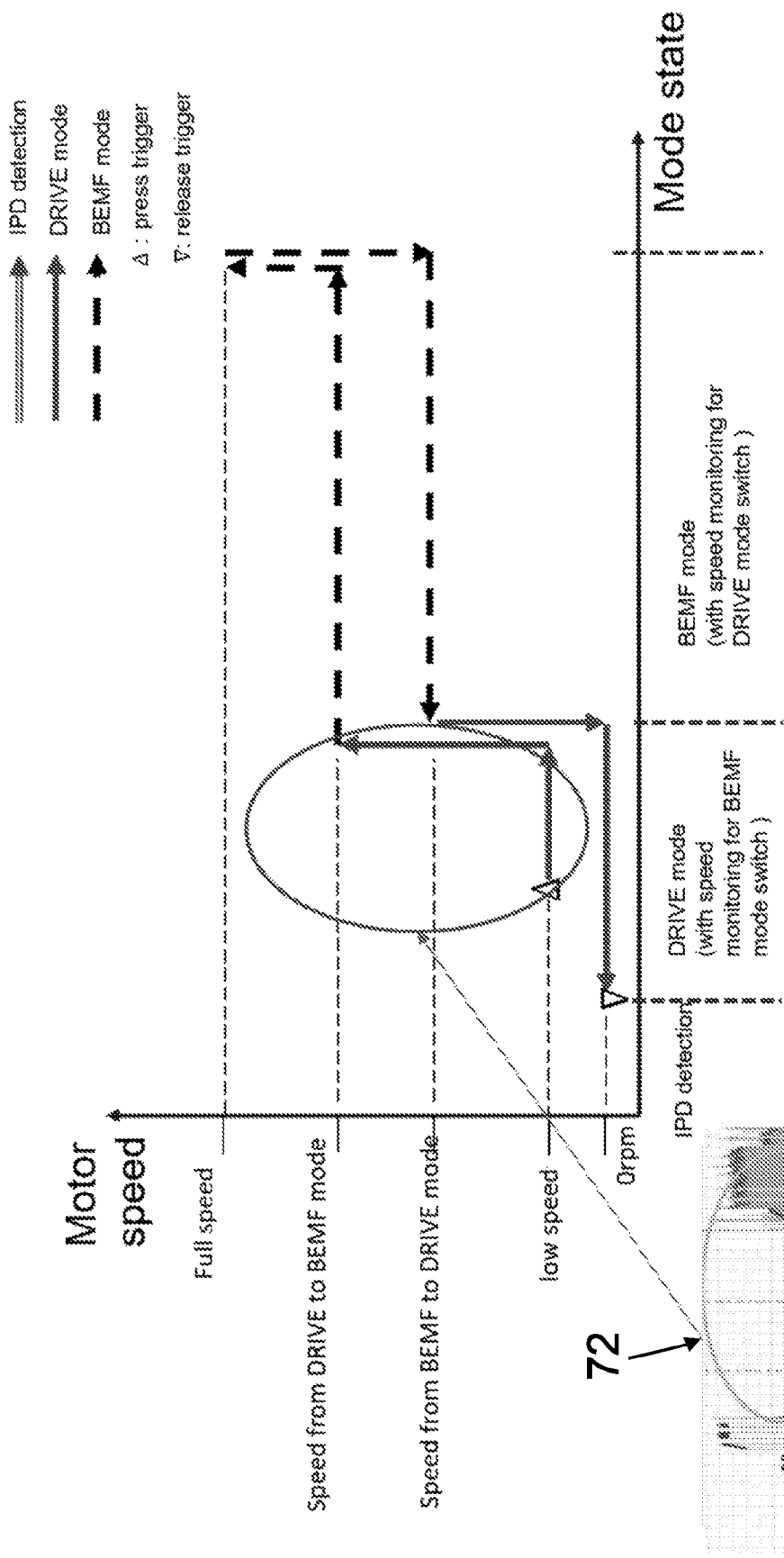
FIG. 6 shows the switching between three rotor position detection methods when the motor of FIG. 3 is started from a low speed.

FIG. 6 is a simplified diagram showing the various speed regions of the motor from zero to full speed, and the corresponding rotor position detection modes for each speed region. In FIG. 6, the difference between the time of mode change in an uprising speed curve and that in a lowering speed curve is ignored.

In the inductance detection method, the motor controller sends signals to the switching module to drive the motor with two types of pulses. One of them is the driver pulse which is similar to typical drive currents used to drive a BLDC motor and speed it up. Another type of the pulses is the detection pulses, which are discrete from one other and the detection pulses are superimposed to the drive signals. The current detector and/or the response detector mentioned above is able to detect the behavior of the motor caused by the detection pulses to determine the various inductances mentioned above. Back to FIG. 3, the change of currents in the three phases of the motor when the motor is changed from the DRIVE mode to the BEMF mode is shown by the waveforms 66. Likewise, the change of currents in the three phases of the motor when the motor is changed from the BEMF mode back to the DRIVE mode is shown by the waveforms 68.

In the third detection method of rotor's position, i.e. the BEMF mode, there is no specific signals (e.g. pulses) injected to the motor by the motor controller. Rather, as the motor is running at a high speed sufficient for its BEMF voltage to be detected, the rotor's position can be determined from the BEMF voltages. When a rotor magnet passes by a phase coil, the rotor magnet generates a current or BEMF in the phase coil. The current and/or EMF can be detected in sensorless motors to determine the rotor position and drive the motor accordingly, as will be described in more details below.

Figure 5:
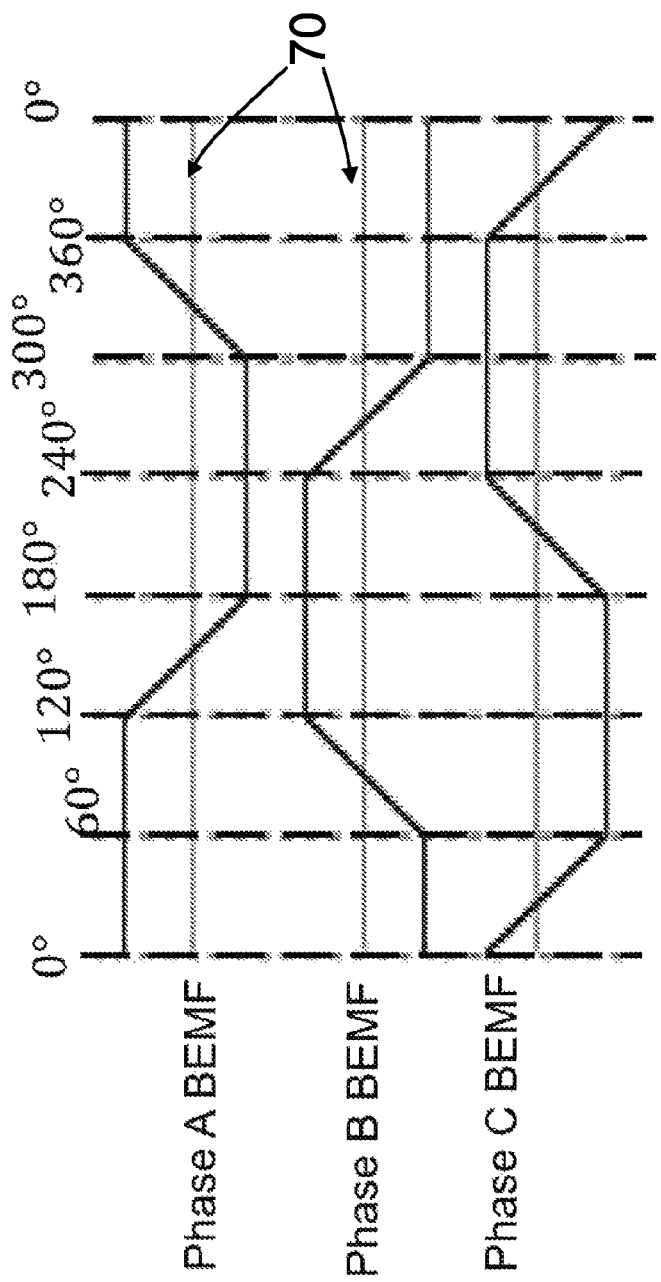
FIG. 5 shows the correspondences between the rotor's position and the comparative magnitude of BEMF at different phases of the motor, when the third method at a high speed is used.

In one implementation as shown in FIG. 5, there is no zero-crossing or neutral point of the BEMF voltages determined. Rather, the BEMF voltages from the three phases of the motor are compared with a reference value to determine the rotor's position. In this method, the response detector of the sensorless motor assembly therefore includes a voltage detector (e.g. a voltage divider network), and there is also a comparator either built-in in the motor controller or being part of the response detector. As shown in FIG. 5, for each of the six angular ranges of the motor as described above, the detected BEMF voltage will be different with respect to a reference value 70. For example, in case the motor's rotor is located in the region of 60°~120°, then Phase A BEMF is substantially constant and above the reference value, while Phase C BEMF is substantially constant and below the reference value, and in addition Phase B BEMF is varying from below the reference value to above the reference value. As shown in FIG. 5, in the BEMF detection method, there is no particular detection pulse injected to the motor, but the BEMF voltages are detected as the motor rotates.

Figure 7:
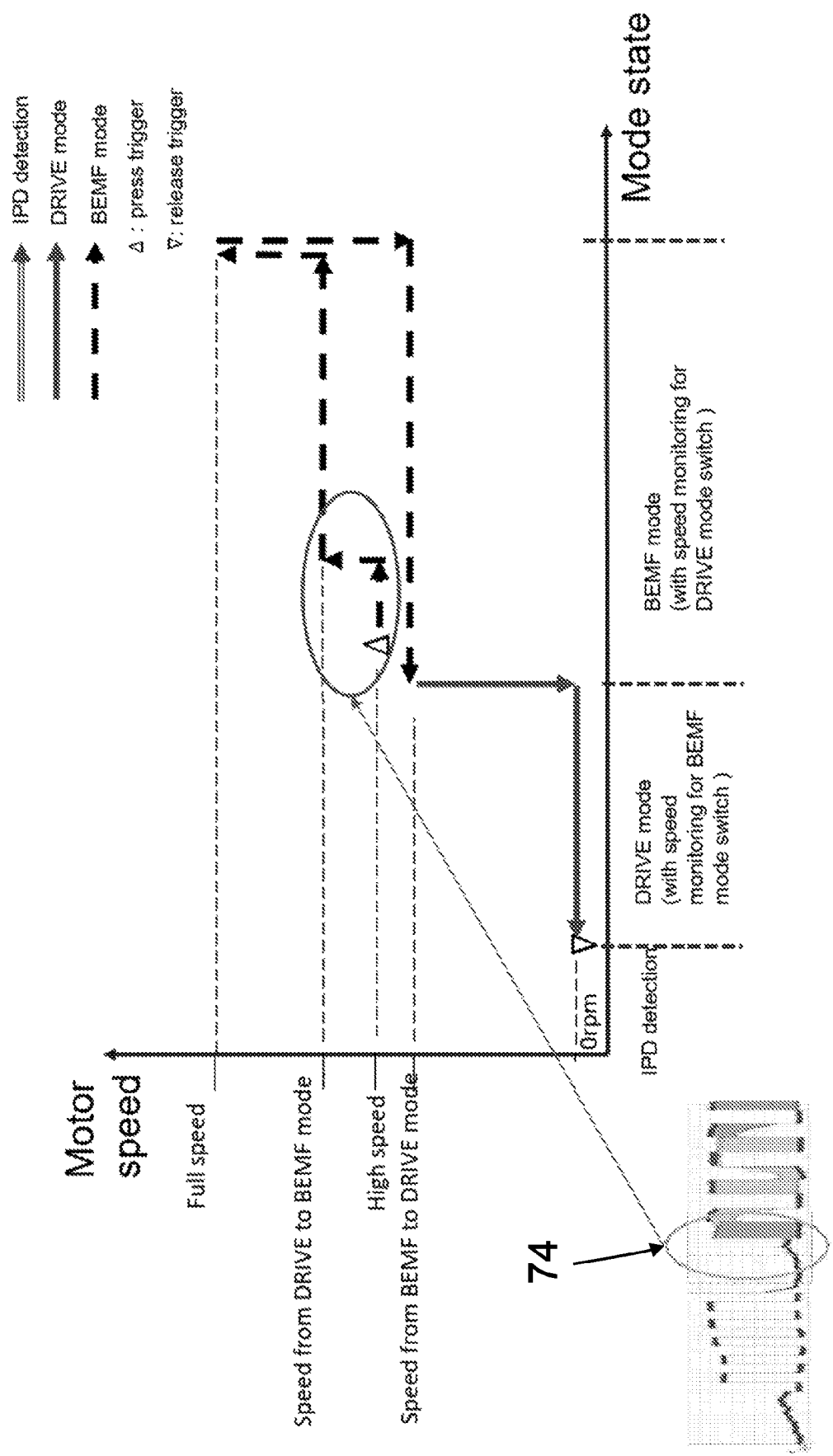
FIG. 7 shows the switching between three rotor position detection methods when the motor of FIG. 3 is started from a high speed.

FIGS. 6 and 7 show respectively how the motor controller apply different detection methods if the motor is not energized from still. In FIG. 6, if the motor is started from a low speed (e.g. before it reaches any of the first and second thresholds mentioned above), then the motor controller will apply the DRIVE mode and uses the inductance detection method directly. The change of currents in the three phases of the motor when the motor is energized at a low speed and enters the DRIVE mode is shown by the waveforms 72. In FIG. 7, if the motor is started from a high speed (e.g. before it reaches the second, lower threshold mentioned above), then the motor controller will apply the BEMF mode and uses the BEMF detection method directly. The change of currents in the three phases of the motor when the motor is energized at a low speed and enters the DRIVE mode is shown by the waveforms 74.

The scenarios shown in FIGS. 6-7 happen when the motor was previously de-energized, or braked (either passively or actively), but before the motor comes to a completely stop, the motor controller receives a user input to start the motor again (e.g. by the user pressing the trigger switch of the power tool). Then, the motor will start at a rotating status.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

What is claimed is:

1. A method of controlling a sensorless motor, the method comprising:
   a) determining a current speed of the motor;
   b) selectively using a first method, a second method, or a third method to determine a position of a rotor of the motor, depending on the current speed of the motor; and
   c) transmitting a drive signal to the motor based on the determined position of the rotor;
   wherein the first method is chosen in step b) if the motor is at zero speed, wherein the second method is chosen in step b) if the current speed of the motor is above zero but below a threshold, and wherein the third method is chosen in step b) if the current speed of the motor is above the threshold; and
   wherein in case of the first method, step b) further includes:
      d) sending a plurality of voltage pulses to multiple phases of the motor,
      e) in response, detecting a peak value in a total current of the motor, and
      f) determining the position of the rotor based on an occurrence time of the peak value.

2. The method of claim 1, wherein the motor is a three-phase motor; step d) further comprising sending six voltage pulses respectively to each of the three phases, and in both a forward and a reverse direction, and wherein based on a correlation between the occurrence time of the peak value to one of the six voltage pulses, step f) further comprises determining the position of the rotor in one of six angular ranges, each being 60°.

3. The method of claim 1, wherein in case of the second method, step b) further comprises:
   g) sending a plurality of voltage pulses to multiple phases of the motor;
   h) in response, determining self-inductances or mutual-inductances of stator windings of the motor; and
   i) determining the position of the rotor based on the self-inductances or the mutual-inductances of the multiple phases.

4. The method of claim 3, wherein step h) further comprises determining an air-gap flux density and a leakage flux density, in order to determine the self-inductances or the mutual-inductances.

5. The method of claim 1, wherein in case of the third method, step b) further comprises:
   j) measuring concurrently voltages of back electromotive force (BEMF) in multiple phases of the motor;
   k) determining the position of the rotor based on the voltages of BEMF of the multiple phases.

6. The method of claim 5, wherein step k) further comprises comparing the voltages of BEMF with each other to determine the position of the rotor.

7. The method of claim 1, wherein none of the first, second and third methods involves the detection of a phase current in the motor.

8. A sensorless motor assembly, comprising
   a) a motor that comprises a stator and a rotor;
   b) a switching module adapted to connect the motor to a power supply; and
   c) a motor controller connected to the switching module;
   wherein the motor controller is adapted to determine a position of the rotor using a first method, a second method, or a third method, depending on a current speed of the rotor;
   wherein the motor controller is adapted to determine the position of the rotor using the first method if the motor is at zero speed; and
   wherein a current sensor is connected to the motor, and wherein in a case of the first method, the motor controller is configured to:
      d) control the switching module to send a plurality of voltage pulses to multiple phases of the motor,
      e) in response, read an electromotive force and a peak value in a total current of the motor from the current sensor, and
      f) determine the position of the rotor based on the peak value and the electromotive force.

9. The motor assembly of claim 8, wherein the motor is a three-phase motor; in case of the first method, the motor controller is adapted to control the switching module to send six voltage pulses respectively to each of the three phases, and in both a forward and a reverse direction, and wherein based on a correlation between the peak value to one of the six pulses, the motor controller is further adapted to determine the position of the rotor in one of six angular ranges, each being 60°.

10. The motor assembly of claim 8, wherein the motor controller is adapted to determine the position of the rotor using the second method if the current speed of the motor is above zero but below a threshold.

11. The motor assembly of claim 10, wherein in the case of the second method, the motor controller is adapted to:
   g) send a plurality of voltage pulses to multiple phases of the motor;
   h) in response, determine self-inductances or mutual-inductances of stator windings of the motor; and
   i) determine the position of the rotor based on the self-inductances or the mutual-inductances of the multiple phases.

12. The motor assembly of claim 11, wherein the motor controller is further adapted to determine an air-gap flux density and a leakage flux density, in order to determine the self-inductances or the mutual-inductances.

13. The motor assembly of claim 8, wherein none of the first, second and third methods involves a detection of a phase current in the motor.

14. The motor assembly of claim 8, wherein the motor controller is adapted to determine the position of the rotor using the third method if the current speed of the motor is above a threshold.

15. The motor assembly of claim 14, wherein in case of the third method, the motor controller is further adapted to:
   j) measure concurrently voltages of back electromotive force (BEMF) in multiple phases of the motor; and
   k) determine the position of the rotor based on the voltages of BEMF of the multiple phases.

16. The motor assembly of claim 15, further comprises a comparator which is adapted to compare the voltages of BEMF with each other, and send results of comparison to the motor controller.

* * * * *